US008276113B2

(12) United States Patent
Limburn

(10) Patent No.: US 8,276,113 B2
(45) Date of Patent: Sep. 25, 2012

(54) DYNAMIC HIGHLIGHTING OF RELATED ARTIFACTS IN A UML DIAGRAM

(75) Inventor: Jonathan J. Limburn, Southampton (GB)

(73) Assignee: International Business Machines Corporation, Armonk, NY (US)

( * ) Notice: Subject to any disclaimer, the term of this patent is extended or adjusted under 35 U.S.C. 154(b) by 1058 days.

(21) Appl. No.: 12/189,337

(22) Filed: Aug. 11, 2008

(65) Prior Publication Data

US 2010/0037203 A1   Feb. 11, 2010

(51) Int. Cl.
*G06F 9/44* (2006.01)

(52) U.S. Cl. ........ 717/105; 717/104; 717/109; 717/113; 717/121

(58) Field of Classification Search .................... None
See application file for complete search history.

(56) References Cited

U.S. PATENT DOCUMENTS

| 5,572,650 | A | 11/1996 | Antis et al. |
|---|---|---|---|
| 6,636,250 | B1 | 10/2003 | Gasser |
| 6,804,686 | B1 * | 10/2004 | Stone et al. ........................ 1/1 |
| 2004/0205726 | A1 * | 10/2004 | Chedgey et al. .............. 717/125 |
| 2004/0243944 | A1 * | 12/2004 | Sabiers et al. ................ 715/853 |
| 2006/0080622 | A1 | 4/2006 | Stuart |
| 2006/0150169 | A1 * | 7/2006 | Cook et al. .................... 717/156 |
| 2007/0050180 | A1 * | 3/2007 | Dori .................................. 703/6 |
| 2008/0104570 | A1 * | 5/2008 | Chedgey et al. .............. 717/105 |
| 2008/0250345 | A1 * | 10/2008 | Li et al. ......................... 715/803 |

OTHER PUBLICATIONS http://www.ccom.unh.edu/vislab/PDFs/IEEEgeon.pdf , Using Perceptual Syntax to Enhance Semantic Content in Diagrams, Jun. 13, 2001, pp. 1-21.

* cited by examiner

*Primary Examiner* — Isaac Tecklu
(74) *Attorney, Agent, or Firm* — Gibb & Riley, LLC

(57) ABSTRACT

A method displays a Unified Modeling Language (UML) diagram on a graphic user interface. The UML diagram can have, for example, nodes representing objects of an object-oriented system. Further, input is received regarding the location of a user-directed pointer on the UML diagram. The location of the pointer identifies a currently "selected node" of the UML diagram. In response to such input, the method dynamically highlights portions of the UML diagram depending on the location of the selected node. This highlighting process dynamically alters the appearances of nodes logically related to the selected node by highlighting nodes that are relatively closely related to the selected node differently (e.g., more brightly) than nodes that are not as relatively closely related to the selected node.

16 Claims, 3 Drawing Sheets

DYNAMIC HIGHLIGHTING OF RELATED ARTIFACTS IN A UML DIAGRAM

BACKGROUND

1. Field of the Invention

The embodiments of the invention generally relate to displaying hierarchical diagrams and more particularly to providing an improved interface with a hierarchical diagram through the use of dynamic highlighting.

2. Description of Related Art

In an object oriented development environment, software applications are developed as a set of objects and classes that interact with one another. Thus, application developers and other users are required to understand complex relationships between components of software systems in order to develop, implement, and maintain such systems. In order to better understand the relationships between objects and their classes, a number of current development tools provide a class browser that allows navigating between the individual classes of a software system or application.

A current technology for understanding complex object oriented software systems is the Unified Modeling Language (UML). UML is a standard graphical language for modeling object-oriented systems. UML can be used to specify, visualize, construct, and document not only software systems but also business models and non-software systems. UML provides a graphical representation of a system design that may be used by developers to assure architectural soundness of a system. UML is frequently used to design the relationships between components (e.g., classes in the case of a Java program) before such components are developed and implemented in source code format.

A number of UML design tools are available for use in conjunction with the design and development of a software system. However, these current UML design tools are focused on system design and are not integrated with a class browser. Typically a developer uses a UML design tool for system design, but uses a separate development tool for developing the source code modules necessary to implement the system from the design. Thus, current UML tooling does not provide a particularly easy way to display complex UML diagrams. Activity diagrams that consist of a large number of objects can be cumbersome to view and edit. Complex diagrams can be split into smaller diagrams showing just the relevant objects; however, a system is not currently available that can display all the objects in a way that is easy to use.

SUMMARY

Presented herein are system, method, and computer storage medium embodiments that provide an improved interface with a hierarchical diagram. As one example, one method herein displays a Unified Modeling Language (UML) diagram on a graphic user interface. The UML diagram is a hierarchical model of the object-oriented system and can have, for example, nodes representing objects of an object-oriented system. Further, input is received regarding the location of a user-directed pointer on the UML diagram.

The location of the pointer identifies a currently "selected node" of the UML diagram. This input from the pointer used to identify the selected node can comprise rolling the pointer over any node of the UML diagram, a single-click or double-click button selection while the pointer is positioned over any node, etc.

In response to such input, the method dynamically highlights portions of the UML diagram depending on the location of the selected node. This highlighting process dynamically alters the appearances of nodes logically related to the selected node by highlighting nodes that are relatively closely related to the selected node differently (e.g., more brightly) than nodes that are not as relatively closely related to the selected node.

An exemplary system embodiment comprises a graphic user output (e.g., a display screen, projector, etc.) displaying the UML diagram. A graphic user input (such as arrow keys, a mouse, a trackball, a touch screen, etc.) is operatively connected to the graphic user output. The graphic user input receives the location of the user-directed pointer on the UML diagram. Again, the location of the pointer identifies the selected node of the UML diagram.

A processor is operatively connected to the graphic user output and the graphic user input, and a computer storage device storing instructions executable by the processor is operatively connected to the processor. These instructions direct the graphic user output to dynamically highlight portions of the UML diagram by altering appearances of nodes logically related to the selected node, depending on the location of the selected node.

The graphic user input identifies the selected node depending upon which of the nodes the pointer is rolled over, which of the nodes the pointer is over when a single-click or double-click button input is received, etc.

These and other aspects of the embodiments of the invention will be better appreciated and understood when considered in conjunction with the following description and the accompanying drawings. It should be understood, however, that the following descriptions, while indicating embodiments of the invention and numerous specific details thereof, are given by way of illustration and not of limitation. Many changes and modifications may be made within the scope of the embodiments of the invention without departing from the spirit thereof, and the embodiments of the invention include all such modifications.

BRIEF DESCRIPTION OF THE DRAWINGS

The embodiments of the invention will be better understood from the following detailed description with reference to the drawings, in which.

DETAILED DESCRIPTION OF EMBODIMENTS

Figure 1:
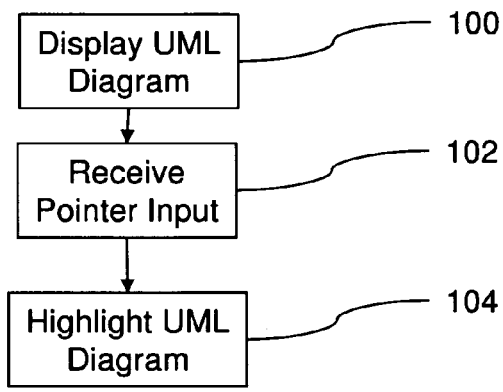
FIG. 1 is a flow diagram illustrating a method embodiment of the invention.

The embodiments of the invention and the various features and advantageous details thereof are explained more fully with reference to the non-limiting embodiments that are illustrated in the accompanying drawings and detailed in the following description. It should be noted that the features illustrated in the drawings are not necessarily drawn to scale. Descriptions of well-known components and processing techniques are omitted so as to not unnecessarily obscure the embodiments of the invention. The examples used herein are intended merely to facilitate an understanding of ways in which the embodiments of the invention may be practiced and to further enable those of skill in the art to practice the embodiments of the invention. Accordingly, the examples should not be construed as limiting the scope of the embodiments of the invention.

As mentioned above, there is a need to simplify the display of UML diagrams. Therefore, presented herein are system, method, and computer storage medium embodiments that provide an improved interface with a hierarchical diagram. The disclosed embodiments herein allow objects on UML diagrams to be selected. Selecting an object will highlight all related objects and relationships on that diagram. The highlighting of these objects means that a user of that model can easily identify any objects and relationships that relate to the object that has been selected. The highlighting of the object will be different depending on how closely the objects will be related.

This disclosure includes a modeling tool that will dynamically highlight related objects in a UML diagram. Clicking on an object will highlight the selected object and all objects and relationships it is associated with. Objects related one relationship away will be highlighted most brightly, objects that are two relationships away will be highlighted slightly less and objects three relationships away will be highlighted slightly less again. Non related relationships or objects will be grayed out, allowing the user to focus on those parts of the diagram that they are currently interested in. This allows the current process of working with complex diagrams to be far less cumbersome.

As shown in flowchart form in FIG. 1, one method herein displays a Unified Modeling Language (UML) diagram on a graphic user interface in item 100. Again, the UML diagram is a hierarchical model of the object-oriented system and can have, for example, nodes representing objects of an object-oriented system. Further, in item 102, input is received regarding the location of a user-directed pointer on the UML diagram.

The location of the pointer identifies a currently "selected node" of the UML diagram. This input from the pointer used to identify the selected node in item 102 can comprise rolling the pointer over any node of the UML diagram, a single-click or double-click button selection while the pointer is positioned over any node, etc.

In response to such input, the method dynamically highlights portions of the UML diagram depending on the location of the selected node in item 104. This highlighting process in item 104 dynamically alters the appearances of nodes logically related to the selected node by highlighting nodes that are relatively closely related to the selected node differently (e.g., more brightly, different colors, different shading) than nodes that are not as relatively closely related to the selected node. Similarly, in item 104, nodes that are unrelated to the selected node can be reduced in color and intensity (grayed out).

Figure 2:
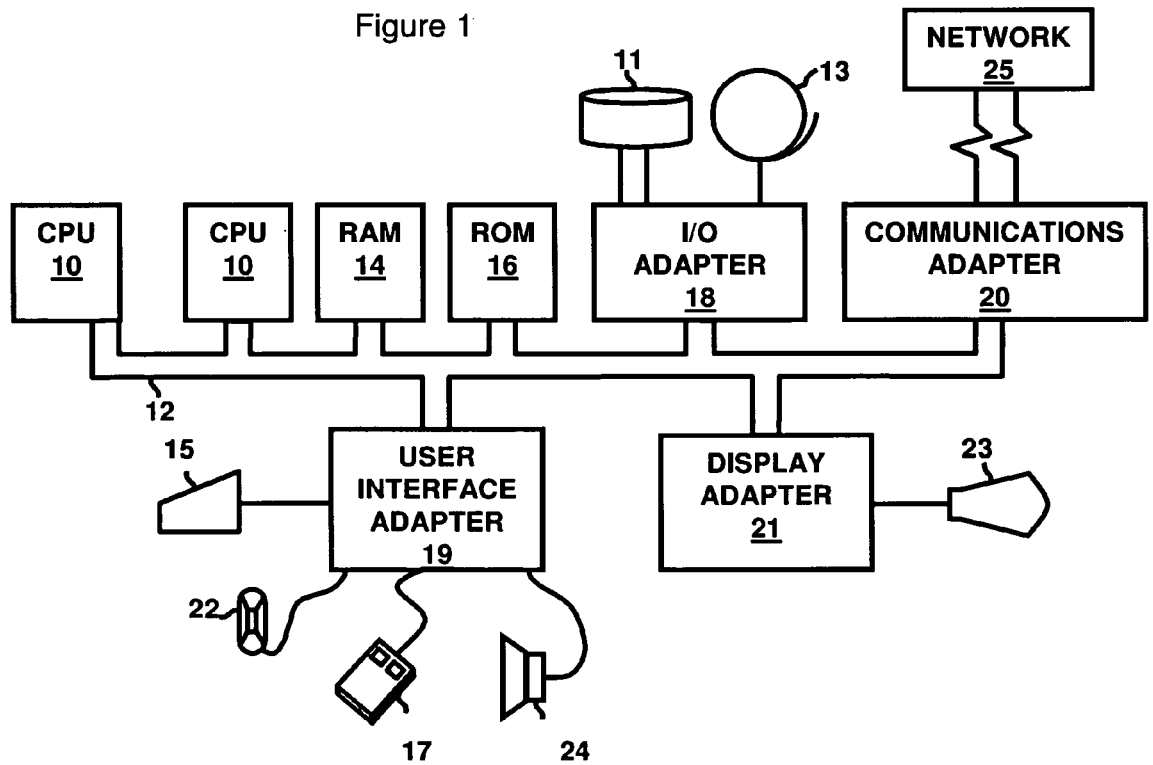
FIG. 2 is a schematic diagram of a system embodiment herein.
Figure 3:
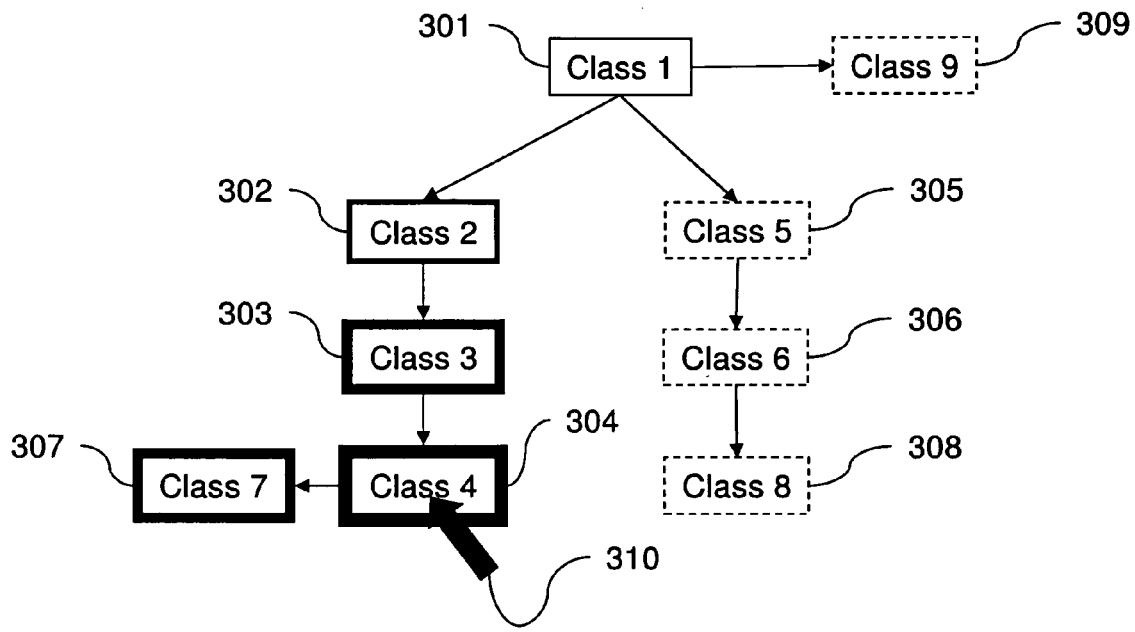
FIG. 3 is a schematic illustration of a UML diagram displayed according to embodiments herein.

FIG. 2 illustrates an exemplary system embodiment. This schematic drawing illustrates a hardware configuration of an information handling/computer system in accordance with the embodiments of the invention. The system comprises at least one processor or central processing unit (CPU) 10. The CPUs 10 are interconnected via system bus 12 to various devices such as a random access memory (RAM) 14, read-only memory (ROM) 16, and an input/output (I/O) adapter 18. The I/O adapter 18 can connect to peripheral devices, such as disk units 11 and tape drives 13, or other program storage devices that are readable by the system. The system can read the inventive instructions on the program storage devices and follow these instructions to execute the methodology of the embodiments of the invention. The system further includes a user interface adapter 19 that connects a keyboard 15, mouse 17, speaker 24, microphone 22, and/or other user interface devices such as a touch screen device (not shown) to the bus 12 to gather user input. Additionally, a communication adapter 20 connects the bus 12 to a data processing network 25, and a display adapter 21 connects the bus 12 to a display device 23 which may be embodied as an output device such as a monitor, printer, or transmitter, for example.

Thus, as shown in FIG. 2 a system embodiment herein has the graphic user output 22 (e.g., a display screen, projector, etc.) displaying the UML diagram. The graphic user input (such as arrow keys, a mouse, a trackball, a touch screen, etc.) is operatively connected to the graphic user output 23. The graphic user input 16, 17, 22, 24, receives the location of the user-directed pointer on the UML diagram. Again, the location of the pointer identifies the selected node of the UML diagram.

A processor 10 is operatively connected to the graphic user output 23 and the graphic user input 16, 17, 22, 24, and a computer storage device 11, 13 storing instructions executable by the processor 10 is operatively connected to the processor 10. These instructions direct the graphic user output 23 to dynamically highlight portions of the UML diagram by altering appearances of nodes logically related to the selected node, depending on the location of the selected node.

The graphic user input 16, 17, 22, 24, identifies the selected node depending upon which of the nodes the pointer is rolled over, which of the nodes the pointer is over when a single-click or double-click button input 16, 17, 22, 24, is received, etc.

As shown in FIGS. 3-6, the nature and level of highlighting is configurable with embodiments herein. For example, the different classes 301-309 are highlighted by altering the color, thickness, and/or shade, etc. of the border. The exemplary diagram shown in FIG. 3 (which would be displayed to the user on the output 23) shows a simple class diagram. In this example class 4 (304) has been selected by the user rolling (positioning) the pointer 310 over class 4 (304) and potentially clicking on class 4 (304). Because the pointer 310 is positioned over class 4 (304); class 4 has the darkest and/or largest border. Classes 7 and 3 (307, 303) which are one class removed from class 4 have the next darkest and/or largest borders. Similarly, the other classes have decreasing border darkness/sizes.

On selecting this object 304, the objects hierarchically associated with item 304 are highlighted in decreasing class order. In this example, class 3 (303) and class 7 (307) are only a single hierarchical relationship from class 4 (304). Therefore, class 3 (303) and class 7 (307) are highlighted one shade of color or darkness (or lightness) away from class 4 to denote them being one relationship away. Class 2 (302) is highlighted a slightly lighter (or darker) color shade to denote class 2 (302) being two relationships away from the selected object 304 and class 1 (301) is highlighted an even lighter color to denote it being three relationships away from the selected object. Classes 5, 6, 8, and 9 (305, 306, 308, and 309) are highlighted an even lighter color shade to denote them being four or more relationships away from the selected object, or as being unrelated.

Figure 4:
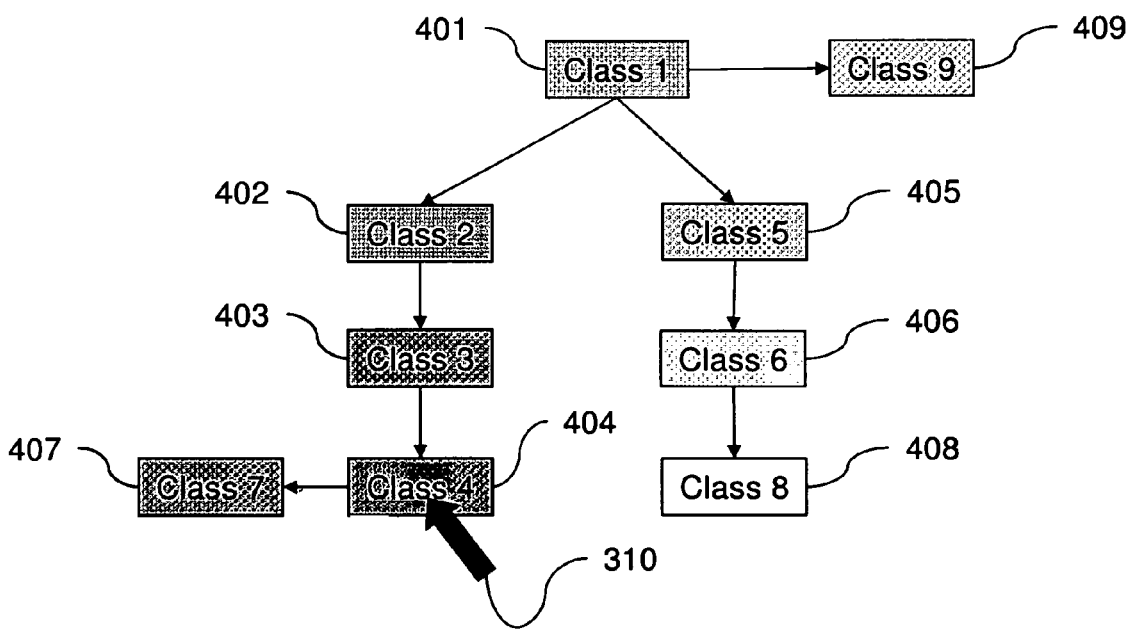
FIG. 4 is a schematic illustration of a UML diagram displayed according to embodiments herein.
Figure 5:
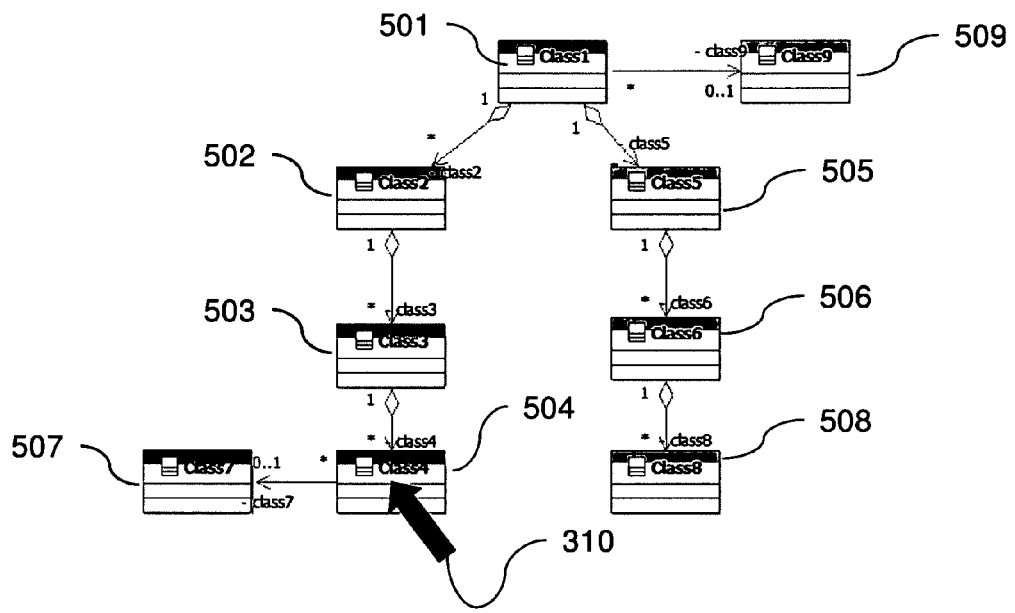
FIG. 5 is a schematic illustration of a UML diagram displayed according to embodiments herein.
Figure 6:
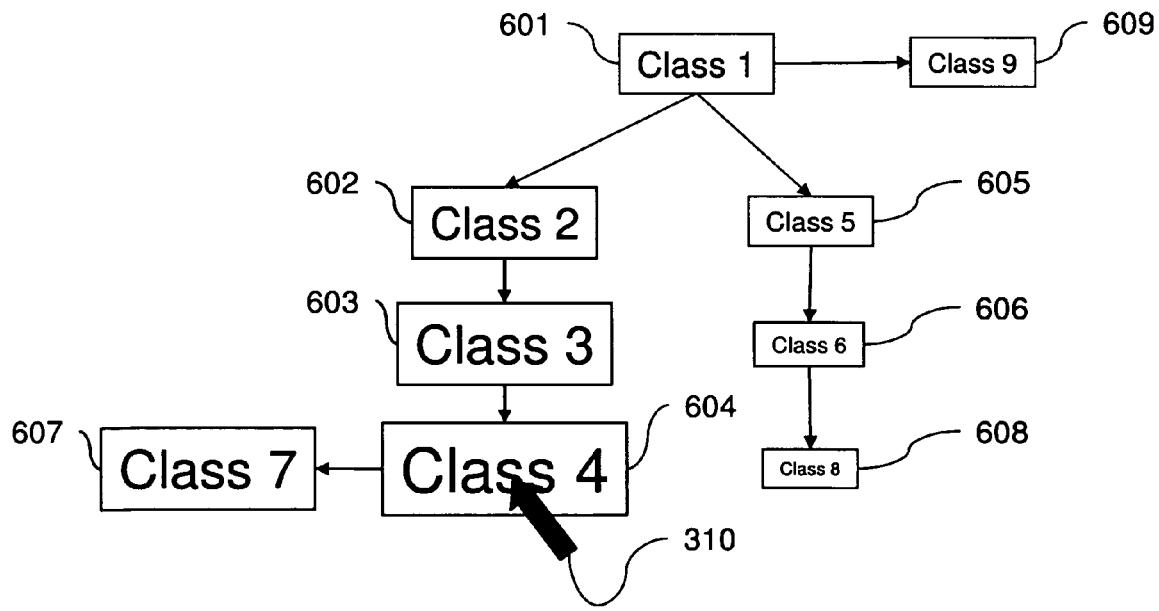
FIG. 6 is a schematic illustration of a UML diagram displayed according to embodiments herein.

Similarly, as shown in FIGS. 4-6, different modes of highlighting can be used. In FIG. 4, the boxes 401-409 representing the different class can have different background colors and/or shading. Also, as shown in FIG. 5, only a portion (e.g., the upper decorative band) of the boxes 501-509 can include different coloring and/or shading. Further, as shown in FIG. 6, the boxes 601-609 can be made different sizes and/or the lettering can be made different sizes.

While the example shown in FIGS. 3-6 rely upon utilizing different shades of color (different darkness or likeness characteristics), different sized features, etc., to graphically indicate the level of relationship between different nodes in the hierarchical UML diagram, those ordinarily skilled in the art would understand that other graphical features could be utilized to demonstrate different degrees of relationship between the nodes within a hierarchical diagram.

In all these examples, the lettering itself can also receive different coloring and/or shading. Further, in all these examples, the highlighting of class 4 (304, 404, 504, 604) has the most extreme highlighting and each level of class away from the location of the pointer 310 receives a less extreme level of highlighting to provide an intuitive indicator that allows the user to more easily recognize the different levels of relationships. In addition, as the pointer 310 is moved, the highlighting dynamically changes so that the class positioned at the pointer receives the most extreme amount of highlighting relative to the other adjacent classes. As shown in FIGS. 3-6, the relationships are highlighted between the associated objects showing the full relationship chain and unrelated classes are not highlighted or are highlighted the least, relative to the other classes.

The embodiments herein do more than simply identify that certain nodes are related to one another through the use of color or shading. Instead, the embodiments herein can graduate the change in color or shading depending upon how close to nodes are logically related to one another.

Therefore, a node that is four relationships away from a selected node will be displayed with a corresponding feature change that is twice as great as a node that is two relationships away from the selected node. Therefore, for example, a node that is four relationships away from a selected node will only be one half as bright (or have only one half the shading) when compared to a node that is two relationships away from the selected node. This allows the user to intuitively understand how closely related one node is to another node relative to all the nodes within the hierarchical diagram.

Further, the amount by which one node (or group of notes) is changed in appearance relative to other nodes that have different relationships with the selected node do not need to have their appearances changed on a strictly linear scale and is mentioned above, but instead a graduated appearance change (e.g., logarithmic) could be utilized, so long as such appearance changes allow the user to intuitively recognize the degree by which certain nodes are removed from the selected node Thus, above embodiments allow selected objects to be highlighted according to relationships of the diagram. The highlighting of these objects means that a user of that model can easily identify any objects and relationships that relate to the object that has been selected. The highlighting of the object will be different depending on how closely the objects will be related. The embodiments herein dynamically highlight related objects in a UML diagram. Clicking on an object will highlight the selected object and all objects having associated relationships. Objects related one relationship away will be highlighted most brightly, objects that are two relationships away will be highlighted slightly less and objects three relationships away will be highlighted slightly less again. Non-related relationships or objects will be grayed out, allowing the user to focus on those parts of the diagram that they are currently interested in. This allows the current process of working with complex diagrams to be far less cumbersome.

The foregoing description of the specific embodiments so fully reveals the general nature of the invention that others can, by applying current knowledge, readily modify and/or adapt for various applications such specific embodiments without departing from the generic concept, and, therefore, such adaptations and modifications should and are intended to be comprehended within the meaning and range of equivalents of the disclosed embodiments. It is to be understood that the phraseology or terminology employed herein is for the purpose of description and not of limitation. Therefore, while the embodiments of the invention have been described in terms of embodiments, those skilled in the art will recognize that the embodiments of the invention can be practiced with modification within the spirit and scope of the appended claims.

What is claimed is:

1. A method comprising:

displaying a Unified Modeling Language (UML) diagram on a graphic user interface, said UML diagram comprising nodes representing objects of an object-oriented system;

receiving input regarding a location of a user-directed pointer on said UML diagram, said location of said pointer identifying a selected node of said UML diagram; and in response to said input, dynamically highlighting portions of said UML diagram depending on said location of said selected node, said highlighting comprising altering appearances of said selected node and related ones of said nodes that are logically related to said selected node to display said related ones of said nodes differently from non-related ones of said nodes that are not logically related to said selected node in said UML diagram, and said dynamically highlighting of said portions of said UML diagram further comprising displaying only said nodes and relationship connectors between said nodes, without splitting said UML diagram into smaller diagrams.

2. The method according to claim 1, said input comprising rolling said pointer over any node of said UML diagram to identify said selected node.

3. The method according to claim 1, said input comprising one of a single-click button selection and a double-click button selection while said pointer is positioned over any node of said UML diagram to identify said selected node.

4. The method according to claim 1, said UML diagram comprising a hierarchical model of said object-oriented system.

5. A method comprising:

displaying a Unified Modeling Language (UML) diagram on a graphic user interface, said UML diagram comprising nodes representing objects of an object-oriented system;

receiving input regarding a location of a user-directed pointer on said UML diagram, said location of said pointer identifying a selected node of said UML diagram; and in response to said input, dynamically highlighting portions of said UML diagram depending on said location of said selected node, said highlighting comprising altering appearances of said selected node and related ones of said nodes that are logically related to said selected node by highlighting closely related ones of said nodes that are relatively closely related to said selected node differently than less closely related ones of said nodes that are not as relatively closely related to said selected node in said UML diagram, and said dynamically highlighting of said portions of said UML diagram further comprising displaying only said nodes and relationship connectors between said nodes, without splitting said UML diagram into smaller diagrams.

6. The method according to claim 5, said input comprising rolling said pointer over any node of said UML diagram to identify said selected node.

7. The method according to claim 5, said input comprising one of a single-click button selection and a double-click button selection while said pointer is positioned over any node of said UML diagram to identify said selected node.

8. The method according to claim 5, said UML diagram comprising a hierarchical model of said object-oriented system.

9. A system comprising:
a graphic user output displaying a Unified Modeling Language (UML) diagram, said UML diagram comprising nodes representing objects of an object-oriented system;
a graphic user input operatively connected to said graphic user output, said graphic user input receiving a location of a user-directed pointer on said UML diagram, said location of said pointer identifying a selected node of said UML diagram;
a processor operatively connected to said graphic user output and said graphic user input; and
a computer storage device storing instructions executable by said processor, said computer storage device being operatively connected to said processor,
said instructions directing said graphic user output to dynamically highlight portions of said UML diagram by altering appearances of said selected node and related ones of said nodes that are logically related to said selected node to display said related ones of said nodes differently from non-related ones of said nodes that are not logically related to said selected node in said UML diagram, depending on said location of said selected node, and
said dynamically highlighting of said portions of said UML diagram further comprising displaying only said nodes and relationship connectors between said nodes, without splitting said UML diagram into smaller diagrams.

10. The system according to claim 9, said graphic user input identifying said selected node depending upon which of said nodes said pointer is rolled over.

11. The system according to claim 9, said graphic user input identifying said selected node depending upon which of said first nodes said pointer is over when one of a single-click button and a double-click button input is received.

12. The system according to claim 9, said UML diagram comprising a hierarchical model of said object-oriented system.

13. A non-transitory computer storage medium tangibly embodying and storing a program of instructions executable by a computer to perform a method comprising:
displaying a Unified Modeling Language (UML) diagram on a graphic user interface, said UML diagram comprising nodes representing objects of an object-oriented system;
receiving input regarding a location of a user-directed pointer on said UML diagram, said location of said pointer identifying a selected node of said UML diagram; and
in response to said input, dynamically highlighting portions of said UML diagram depending on said location of said selected node, said highlighting comprising altering appearances of said selected node and related ones of said nodes that are logically related to said selected node to display said related ones of said nodes differently from non-related ones of said nodes that are not logically related to said selected node in said UML diagram, and
said dynamically highlighting of said portions of said UML diagram further comprising displaying only said nodes and relationship connectors between said nodes, without splitting said UML diagram into smaller diagrams.

14. The non-transitory computer storage medium according to claim 13, said input comprising rolling said pointer over any node of said UML diagram to identify said selected node.

15. The non-transitory computer storage medium according to claim 13, said input comprising one of a single-click button selection and a double-click button selection while said pointer is positioned over any node of said UML diagram to identify said selected node.

16. The non-transitory computer storage medium according to claim 13, said UML diagram comprising a hierarchical model of said object-oriented system.

* * * * *